US012786096B2

(12) United States Patent
Everson et al.

(10) Patent No.: US 12,786,096 B2
(45) Date of Patent: Nov. 3, 2026

(54) POLICY DRIVEN TRAFFIC ROUTING THROUGH DYNAMICALLY INSERTED NETWORK SERVICES

(71) Applicant: Certes Networks, Inc., Pittsburgh, PA (US)

(72) Inventors: Sean D. Everson, Valencia, PA (US); Benn Linger, Carnegie, PA (US); Suryanathan Padmanabhan, Pittsburgh, PA (US); Ganesh Murugesan, Bangalore (IN)

(73) Assignee: Certes Networks, Inc., Pittsburgh, PA (US)

( * ) Notice: Subject to any disclaimer, the term of this patent is extended or adjusted under 35 U.S.C. 154(b) by 63 days.

(21) Appl. No.: 18/537,206

(22) Filed: Dec. 12, 2023

(65) Prior Publication Data

US 2024/0205144 A1 Jun. 20, 2024

Related U.S. Application Data

(60) Provisional application No. 63/387,161, filed on Dec. 13, 2022.

(51) Int. Cl.
*H04L 45/0377* (2022.01)
*H04L 41/0894* (2022.01)

(52) U.S. Cl.
CPC ...... *H04L 45/0377* (2022.05); *H04L 41/0894* (2022.05)

(58) Field of Classification Search
CPC ... H04L 45/42; H04L 45/3065; H04L 45/566; H04L 41/0894; H04L 45/0377
See application file for complete search history.

(56) References Cited

U.S. PATENT DOCUMENTS

| | | | | |
|---|---|---|---|---|
| 10,243,793 | B1 * | 3/2019 | di Proietto | H04L 41/024 |
| 11,422,791 | B2 * | 8/2022 | Guo | G06F 9/4843 |
| 11,792,071 | B1 * | 10/2023 | Nadeem | H04L 63/20 709/220 |
| 11,991,216 | B1 * | 5/2024 | Venkatachari | H04L 63/20 |
| RE50,121 | E * | 9/2024 | Olofsson | H04L 45/64 |
| 2007/0294312 | A1 * | 12/2007 | Seshadri | G06F 9/44505 |
| 2016/0283259 | A1 * | 9/2016 | Mehta | G06F 9/45558 |

(Continued)

*Primary Examiner* — David R Lazaro
(74) *Attorney, Agent, or Firm* — Hamilton, Brook, Smith & Reynolds, P.C.

(57) ABSTRACT

A method of managing and deploying network resources, comprising employing a container management tool in a network that implements resources through one or more containers, and engaging a policy extension with the container management tool. The policy extension may be configured to define and enforce user intent in a forwarding plane of the network. The method may comprise using a declarative programming language to convey the intent of the user to the policy extension. The container management tool may be Kubernetes, and the policy extension may define policy as a Custom Resource Definition. The container may comprise a microservice packaged along with associated dependencies and configurations. The method may further comprise defining, by the user, (i) at least one network resource, (ii) at least one service, (iii) at least one policy, and (iv) delivering network data traffic to the at least one service according to the at least one policy.

20 Claims, 4 Drawing Sheets

(56) References Cited

U.S. PATENT DOCUMENTS

| | | | | |
|---|---|---|---|---|
| 2019/0045037 | A1* | 2/2019 | Sukhomlinov | G06F 9/5077 |
| 2020/0052967 | A1* | 2/2020 | di Proietto | H04L 41/024 |
| 2021/0120080 | A1* | 4/2021 | Mishra | H04L 12/66 |
| 2021/0240540 | A1* | 8/2021 | Wang | G06F 9/45558 |
| 2021/0318914 | A1* | 10/2021 | Moyer | G06F 16/2282 |
| 2022/0121455 | A1* | 4/2022 | Hoban | G06F 21/577 |
| 2022/0124150 | A1* | 4/2022 | Alagna | H04L 61/4511 |
| 2022/0129326 | A1* | 4/2022 | Singh | G06F 9/505 |
| 2022/0247784 | A1* | 8/2022 | Satish | H04L 41/22 |
| 2022/0286480 | A1* | 9/2022 | Jadhav | H04L 63/20 |
| 2022/0342707 | A1* | 10/2022 | Alagna | H04L 67/1097 |
| 2023/0022134 | A1* | 1/2023 | Talwar | G06F 9/45558 |
| 2023/0109396 | A1* | 4/2023 | Jain | H04L 47/125<br>709/224 |
| 2023/0155941 | A1* | 5/2023 | Parla | H04L 41/147<br>709/226 |
| 2023/0261940 | A1* | 8/2023 | Jiang | H04L 41/14<br>709/224 |
| 2024/0152378 | A1* | 5/2024 | Sadasivan | G06F 8/60 |
| 2024/0179071 | A1* | 5/2024 | Zhou | H04L 41/0895 |
| 2024/0205144 | A1* | 6/2024 | Everson | H04L 45/42 |

* cited by examiner

POLICY DRIVEN TRAFFIC ROUTING THROUGH DYNAMICALLY INSERTED NETWORK SERVICES

RELATED APPLICATION

This application claims the benefit of U.S. Provisional Application No. 63/387,161, filed on Dec. 13, 2022. The entire teachings of the above application are incorporated herein by reference.

BACKGROUND

Modern enterprise networks generally require several network services to be placed on the edge of their network. These services have been typically implemented as separate, dedicated network appliances, each independently performing its own functions. Examples of such network appliances are shown in FIG. 1A.

In modern networks that need to service dynamically changing requirements, such discrete hardwiring of network appliances is unacceptable because doing so does not allow the enterprise to rapidly adapt to changing network conditions.

Recently, network appliances have been virtualized and implemented as independent virtual machines on one or more general purpose servers, as depicted in FIG. 1B.

While virtualized servers may remove physical restrictions, it is still difficult to deploy and manage them on a dynamic basis. Virtualized servers require complex deployment and management systems, typically provided by the vendor, that facilitate hosting of virtualized services. Resource management, scheduling of the services, and operational maintenance of such systems, all using proprietary management systems, is very complex, thereby diminishing advantages gained by virtualization. Even virtualized servers cannot selectively specify which set of services are to be applied to a specific network flow.

Currently-deployed systems only support forwarding all traffic from a network port to the service (i.e., without classification), and all traffic from the service to a group of network ports. This does not give enough control to the operator to segment the access to critical resources, which leaves the enterprise customer without viable options for building an enterprise network that can dynamically adapt to its consumer requirements.

Another challenge with virtualization systems is a preference to offer the services through a standards-based management ecosystem. Standards such as ETSI/MANO are too complex to efficiently implement (for the vendors) and to manage (for the customers).

SUMMARY

Modern enterprise requires application of a different set of network services to flows depending on the corporate policies. Such flexibility does not exist in prior art appliances or virtual servers. The described embodiments support a simple ecosystem that allows dynamic insertion of network services that can be managed efficiently, without requiring a complex set of management paradigms. The described embodiments operate to create and use network resources when required, and give the resources away when the work is done.

The described embodiments enable enterprise customers to insert network services into their forwarding network path in a very simple elegant fashion as desired, and to use policy to give full control to the network operator to guide their traffic through the desired set of network services (referred to herein as "micro-segmentation").

The described embodiments further provide a fully programmable system through a declarative programming, using a standards-based approach and a standard mechanism to collect services status and statistics.

The described embodiments may further provide an ability to add different encapsulation between each service on a single service-list. This may be the same encapsulation or different depending on the needs of the services and how the services are defined. Eg encapsulations used are. NSH, VLAN, DiffServ.

The described embodiments may further provide an ability to apply a policy whose services may span across the network through multiple network appliances.

The described embodiments may further provide an ability to insert new services into an existing policy dynamically.

The described embodiments may further provide an ability to remove existing services from an existing policy and continue to use the policy.

The described embodiments may further provide an ability to reuse the same policy for multiple flows (Multiple selectors to match flows).

The described embodiments may further provide an ability to reclassify the packet in the midst of the processing. This is the diagram that shows two policies.

The described embodiments may further provide an ability to share a network service across multiple policies. The same service can be part of many policy definitions.

The described embodiments may further provide an ability to use Kubernetes containers management to create multiple instances of the same service and specify which policies can use which instance of the service.

The described embodiments may further provide an ability to dynamically change a resource requirement for each network service (e.g., through Kubernetes and containers). This can be done dynamically without bringing the service down and user will not even notice. We use Kubernetes to create the new instance of the service with the new resource requirement and then switch to using it in a hitless fashion using native Kubernetes tools.

In one aspect, the invention may be a method of managing and deploying network resources, comprising employing a container management tool in a network that implements resources through one or more containers, and engaging a policy extension with the container management tool, the policy extension configured to define and enforce an intent of a user in a forwarding plane of the network.

An embodiment may further comprise using a declarative programming language to convey the intent of the user to the policy extension. The container management tool may be Kubernetes. The policy extension may define policy as a Custom Resource Definition (CRD).

The container may comprise a microservice that is packaged along with associated dependencies and configurations.

The method may further comprise defining, by the user, (i) at least one network resource, (ii) at least one service, (iii) at least one policy, and delivering network data traffic to the at least one service according to the at least one policy. The at least one network resource may be defined on Open vSwitch. The method may further comprise programming match selectors as match rules in the forwarding plane of the network, the match selectors being programmed according to the intent of the user. The method may further comprise forwarding a data packet at an applied network port through a service function chain when the data packet matches the match selectors. The at least one policy may cause the forwarding plane to configure an action list as a sequential service function chain in a data path.

In another aspect, the invention may be a system for managing and deploying network resources in a network that implements resources through one or more containers, comprising a processor and a memory with computer code instructions stored thereon. The memory may be operatively coupled to the processor such that, when executed by the processor, the computer code instructions cause the system to engage a policy extension with a container management tool. The policy extension may be configured to define and enforce an intent of a user in a forwarding plane of the network. The computer code instructions may further cause the system to use a declarative programming language to convey the intent of the user to the policy extension.

The container management tool may be Kubernetes. The policy extension may define policy as a Custom Resource Definition (CRD). The container may comprise a microservice that is packaged along with associated dependencies and configurations. The computer code instructions, when executed by the processor, may further cause the system to define at least one network resource based on input from the user, define, by the user, at least one service, define, by the user, at least one policy, and deliver network data traffic to the at least one service according to the at least one policy.

The at least one network resource may be defined on Open vSwitch. The system may further comprise match selectors programmed as match rules in the forwarding plane of the network, the match selectors being programmed according to the intent of the user. The system may further comprise a data packet forwarded at an applied network port through a service function chain when the data packet matches the match selectors. The at least one policy may cause the forwarding plane to configure an action list as a sequential service function chain in a data path.

In another aspect, the invention may comprise a non-transitory computer-readable medium with computer code instruction stored thereon. The computer code instructions, when executed by a processor, may cause a system to engage a policy extension with a container management tool. The policy extension may be configured to define and enforce an intent of a user in a forwarding plane of the network. The computer code instructions may further cause the system to using a declarative programming language to convey the intent of the user to the policy extension.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
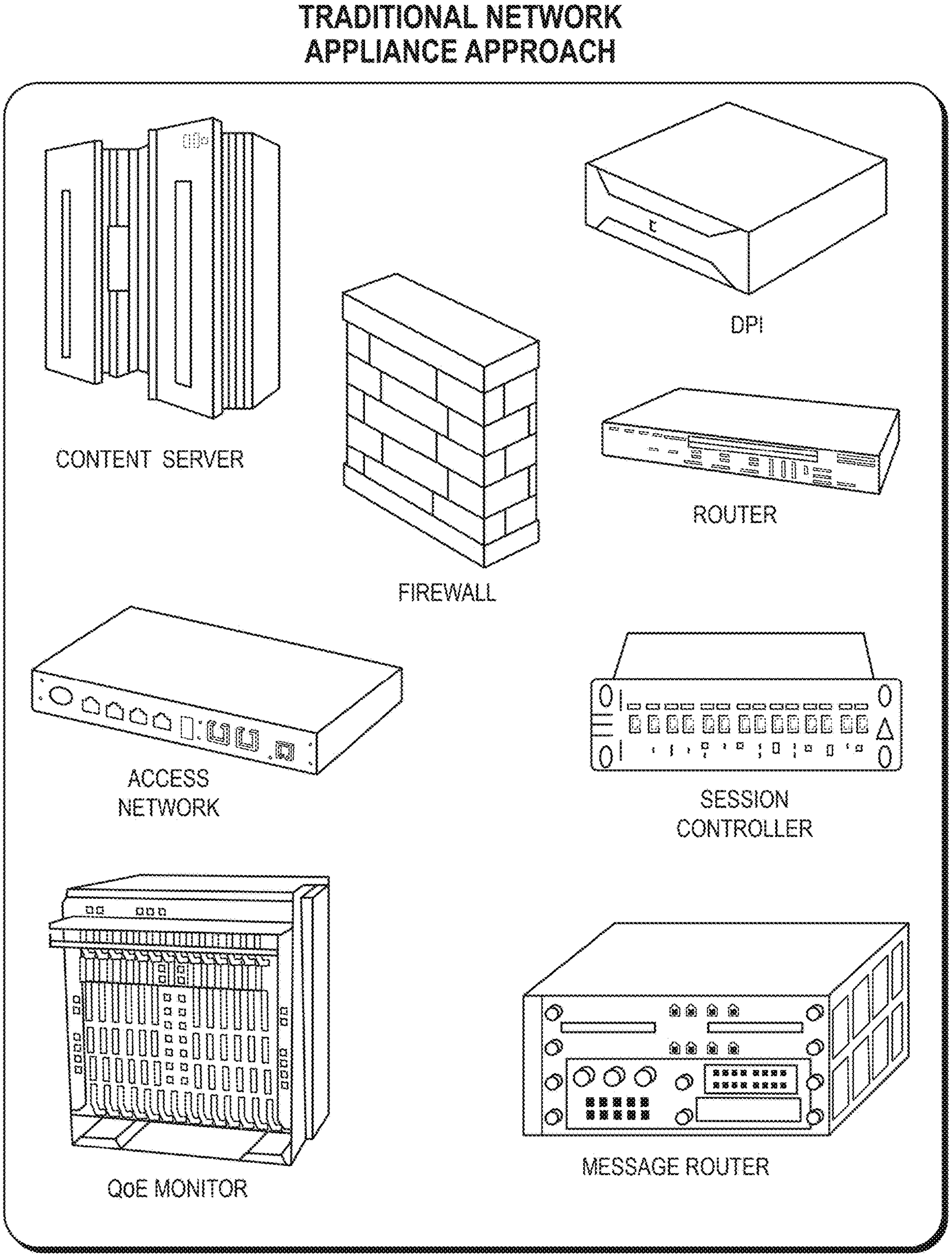
FIG. 1A shows examples of network appliances that may be used to provide services to an enterprise network.
Figure 1B:
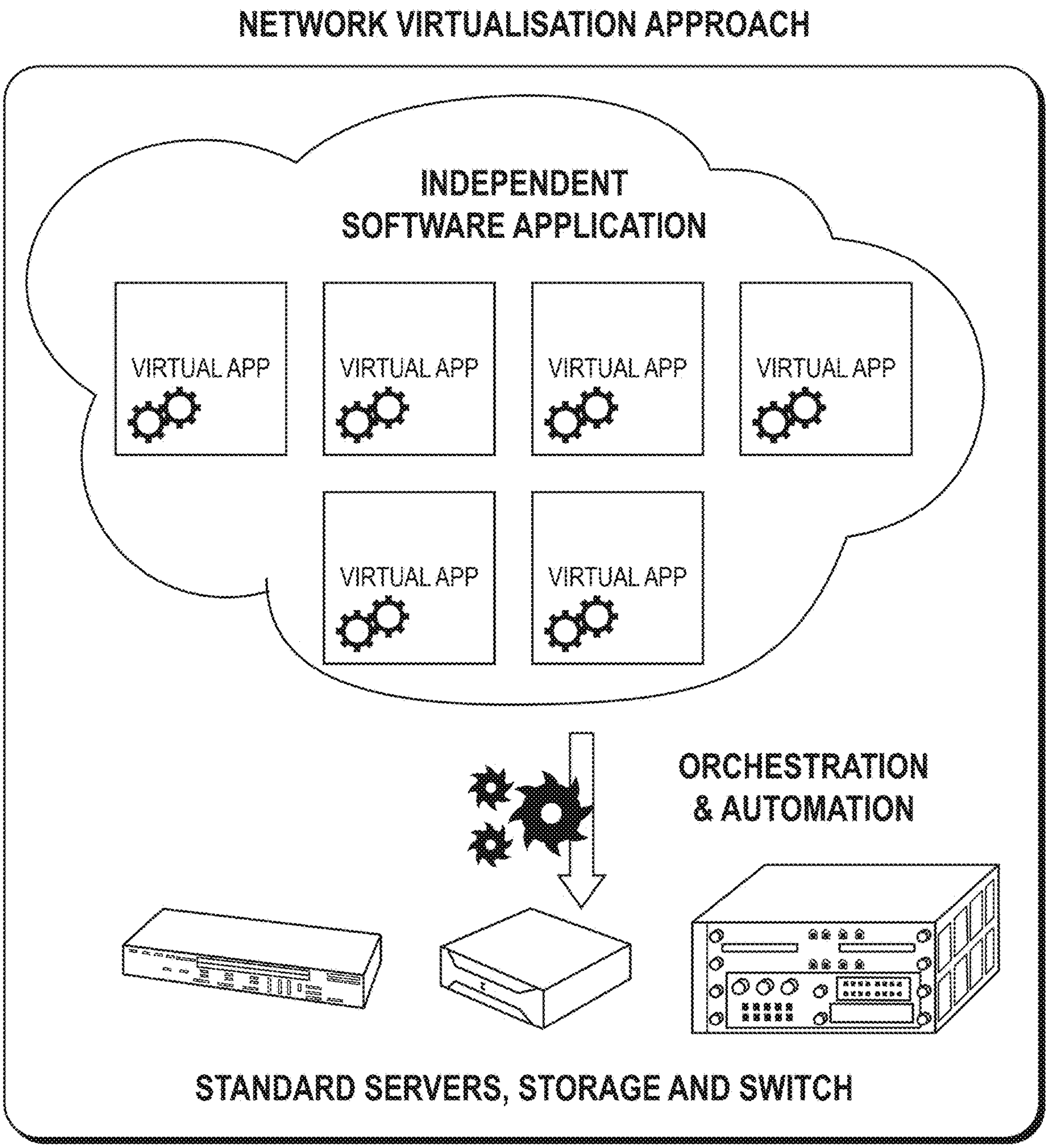
FIG. 1B shows examples of network appliances that have been virtualized and implemented as independent virtual machines on one or more general purpose servers.

A description of example embodiments follows.

Dynamic Service Insertion and Management

Present-day applications for hosting services are most often implemented using containers, rather than virtual machines. Containers are microservices packaged along with their dependencies and configurations. Containers provide an efficient framework for hosting microservices. This allows for implementation of each networking service as a microservice in a container.

The described embodiments utilize a container management tool for deploying and managing containers. An example embodiment uses a container management tool known as Kubernetes, although other such control-plane management tools may alternatively be used. Kubernetes (pronounced "koo-ber-net-ees"—also known in the art as "k8s" or "k-eights") is open-source software for deploying and managing containers at scale. Kubernetes may be used as a control plane for managing containerized virtual network services. Kubernetes eliminates the need for complex management of scheduling and resource management for containerized services.

Modern enterprise requires dynamic and selective starting and deploying network services on a need basis. The network service is no longer required, however, once the network service is completed. The embodiments described herein leverage Kubernetes to dynamically create and delete network services, thereby saving resources that would otherwise not be available for other purposes. The example embodiments use Kubernetes as the framework to facilitate dynamic insertion of containerized services, based on customer needs, using declarative programming. The user provides the desired services to be instantiated on a collection of network devices across the network using a declarative mechanism (resource definitions) that Kubernetes understands and accepts for management. The resource definitions may include the resource location, and service requirements of the resource such as CPU, memory, networking, and filesystem elements. Kubernetes may also handle service expansions, re-orchestrations, and other such network services.

Policy Extension

Ideally, a user (e.g., network operator) should be able to create a set of network services dynamically. The user would define a set of rules to indicate how data must pass through the set of network services along with other existing services. The user may wish to identify what network service must be applied to a particular set of network flows, and to be able to define the set of services that must be applied, including the sequence of the network services. The user may create a policy (via the Kubernetes policy extension framework defined herein. The policy defines a set of attributes that must match the flows. All flows that match these network attributes will be mandatorily forced to go through the sequence of network services so that those services can take appropriate action. In an example case where an enterprise is running traditional Ethernet and IPv4/IPv6 networks, a policy definition can support matching attributes in any of the Ethernet, IPv4, IPv6, TCP, and/or UDP headers. Example fields may include Ethernet Type, VLAN ID, Source IPv4 or IPv6 address, Destination IPv4 or IPv6address, IPv4 protocol, TCP Source Port, TCP Destination Port, TCP Flags, UDP Source Port, and UDP Destination Port. When the services are no longer needed, the user can immediately decommission all those services by using native Kubernetes container operations and remove the policy. Doing so will take seconds/minutes instead of days/months, and all the compute resources are freed and given back to a common pool for other allocations if required. The policy definition can apply to a set of network services that can span the network, and does not need to be restricted to a single device.

Figure 2:
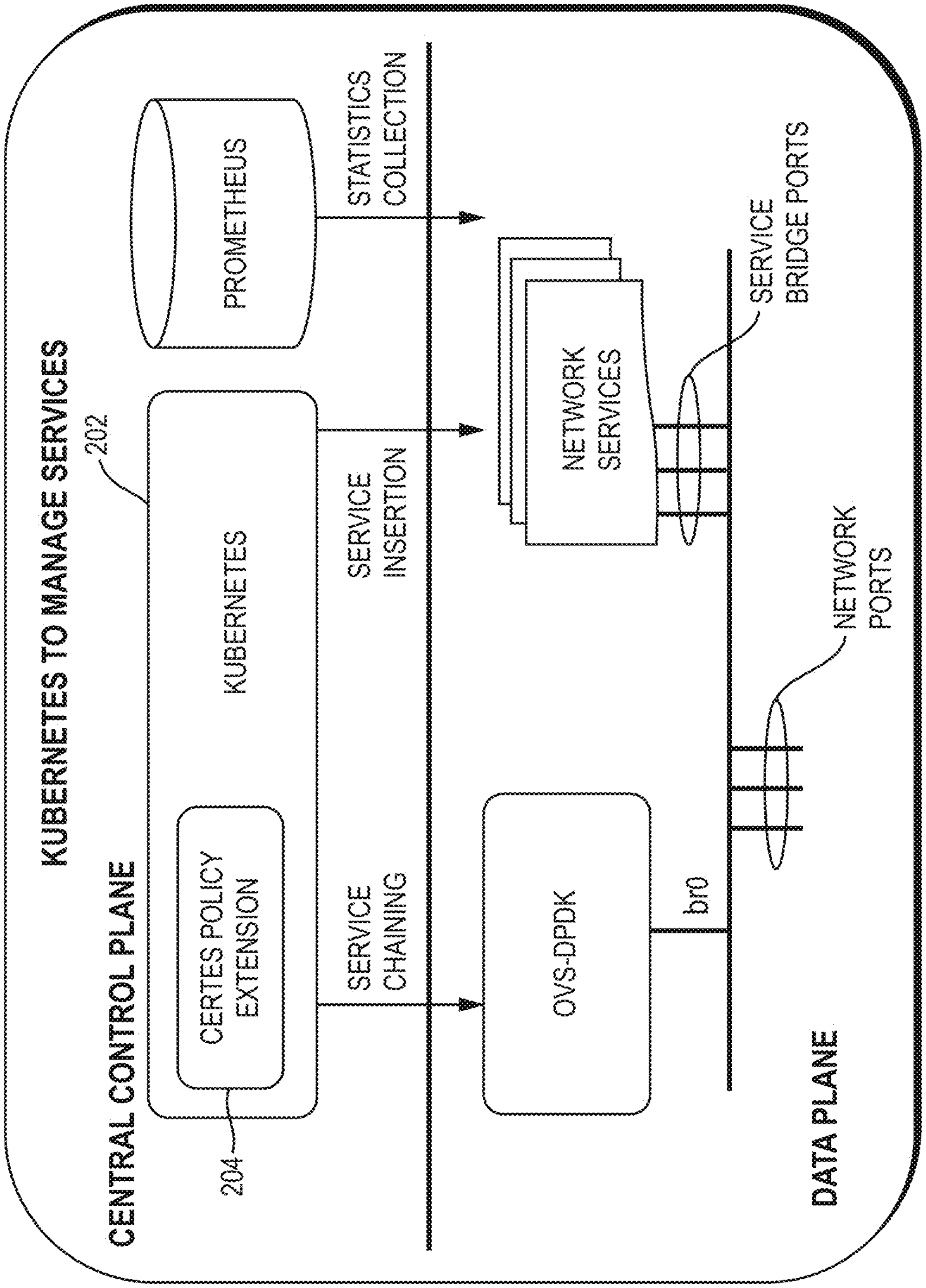
FIG. 2 shows an example embodiment of a policy extension according to the invention.

As set forth above, Kubernetes is a control plane management tool that can manage network resources and deployments of those network resources. The embodiments described herein expand the capability of Kubernetes 202 (or other container management tool) by natively implementing an extension to Kubernetes 202, which defines policy as a Custom Resource Definition (CRD). See, for example, the example embodiment shown in FIG. 2. This policy extension (PE) 204 allows the end user to use declarative programming to define policies in the enterprise that will define and enforce user intent in the forwarding plane. These policies enforce delivering network data through the desired set of inserted services. The PE 204 thus implements a novel mechanism to dynamically stitch a set of network services over an Open vSwitch data plane.

The policy extension 204 of the described embodiments also allows for programmatically stitching of different service function chains based on the packet flow behavior. The described embodiments allow services to apply their own rules to the packets that might change the behavior of the packet processing, which allows a different policy to be applied to the modified packet through a different set of services. This rule application is done completely programmatically, without any user intervention.

The policy extension 204 of the described embodiments also allows for different encapsulation through each service function in the chain of network services. These policies provide the ability to match the traffic at the lowest granularity and dictate how they must be processed through their dynamically created service function chain. The described embodiments provide for the enterprise operator to match flow-based traffic through the desired set of service functions.

The Kubernetes policy extension 204 of the described embodiments allows the customer to deploy a system that doesn't require a complex management orchestration system and is extensively programmable, which allows customers to define security or network policies dynamically based on the current state of their network. Although the example embodiments utilize Kubernetes, it should be understood that other container management tools may alternatively be used.

The described embodiments give full control for the enterprise operator to dynamically insert services into the network at any place and direct appropriately the traffic through the services and allows extending the traffic to be applied through a sequence of services as desired by the user intent. The described embodiments allow for this creation of service function chain to span across multiple network nodes and is not limited to a single node.

The described embodiments facilitate simplified service insertion by providing the full control to the user. The user may define a policy to map traffic to the new service or insert the new service into an existing service path (action List), which causes the new service is applied on flows that match the policy. Adding the service in a service function path also triggers the creation of the service using native Kubernetes mechanism (On Demand resource allocation trigger).

The job of the policy is only to get the traffic to and/or from the service in the service function path. When action is removed from all policies, the service container can be deactivated thereby releasing the compute resources (dynamic resource release triggers).

The following illustrates an example embodiment according to the invention. This example embodiment merely illustrative and is not intended to be limiting.

User Defines Network Resources

The user defines Network resources such as network ports using Kubernetes API. These resources are normally created on Open vSwitch using Kubernetes native functions. These network resources are then used to apply traffic arriving/departing on these resources to the dynamically created service function chains.

User defines a service.

The user may define a service via a standards-based Helm chart. A Helm chart defines the characteristics required to deploy a micro-service as a container on the target platform. On instantiating the Helm chart, the service specifies the necessary resources, including, for example, building its service ports on Open vSwitch, which is an open-source implementation of a distributed virtual multilayer switch. The service also may allocate other system resources such as CPU, memory and filesystem space. The service advertises the action(s) associated with the service to the control plane.

User defines a policy.

The user may define a policy using the Custom Resource Definition provided as an extension to Kubernetes API Server. A policy may consist of the following:

(a) Properties—general attributes such as a user defined name, description, identifier, priorities.
(b) Set of Match Selectors—identify the network elements that are used to match packets traversing through the network device. The Set of Match Selectors (also known as resources) may include, but are not limited to, information such as names, addresses, service ports, and protocols.
(c) Action List—a desired sequence of services to which the matching traffic is forwarded. These services may inspect the traffic, modify the network headers or discard them.
(d) Policy Destination—specification of network resource destinations to which the policy is to be applied. The policy destination will generally be one or more network resource devices and/or a set of network ports on those devices. The policy destination may also include desired directionality.

Deliver Policy Driver Traffic to the User Defined Services

The policy match selectors are programmed to match rules in the forwarding plane as desired by the user intent of the policy. The data plane programs the action list as a sequential service function chain in the data path. When traffic arrives on the applied network port and matches the Match selectors, the data plane forwards the packet through the service function chain. The forwarding through the service function chain uses any of the possible standard networking encapsulations, e.g., (i) Network Service Header (NSH), (ii) VLAN, (iii) Differentiated Service Code Point (DSCP) Bits in IP header. Multiple encapsulation types may be used on the same policy. When traffic exits the service function chain, it is either discarded or forwarded to another network or to another service function chain. This decision is based on the actions taken in the service functions in the chain or defined by the user intent. The user has full control to automatically (i) start the resources, (ii) allocate compute and network resources natively on-demand, (iii) redirect desired traffic flows to the service(s), and (iv) apply the policy on desired network ports or functions.

Figure 3:
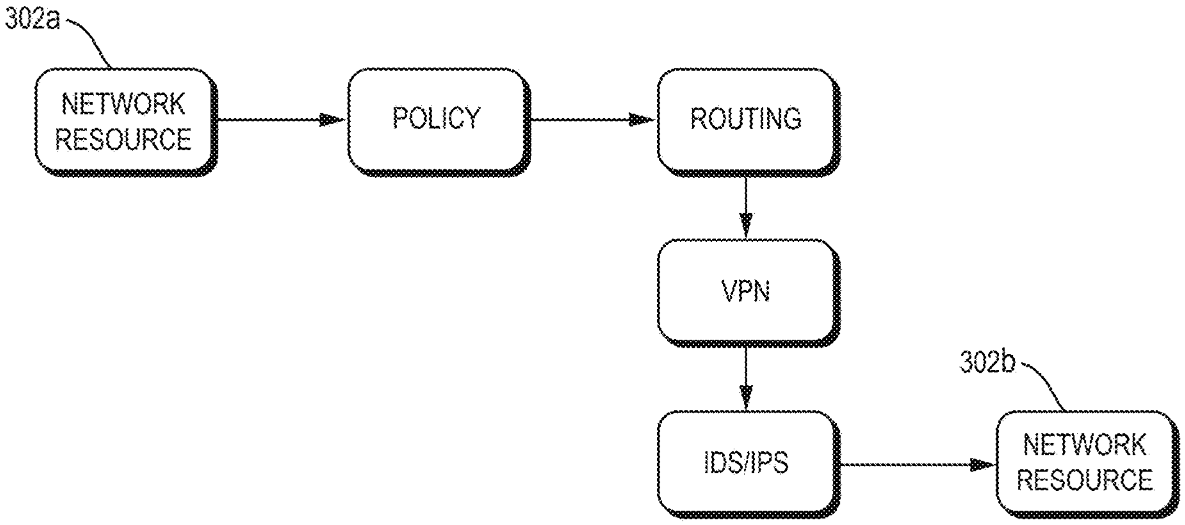
FIG. 3 illustrates an example embodiment of defining policy to redirect traffic from network resource to a set of network functions and then out through a network resource.

FIG. 3 illustrates an example embodiment of defining policy to redirect traffic from network resource 302*a* to a set of network functions (e.g., intrusion detection system/intrusion prevention system - IDS/IPS) and then out through a network resource 302*b*. In some embodiments, there may be network resources that terminate the traffic and do not forward further. For example, if the network service is a web server, then traffic will terminate on the server.

Figure 4:
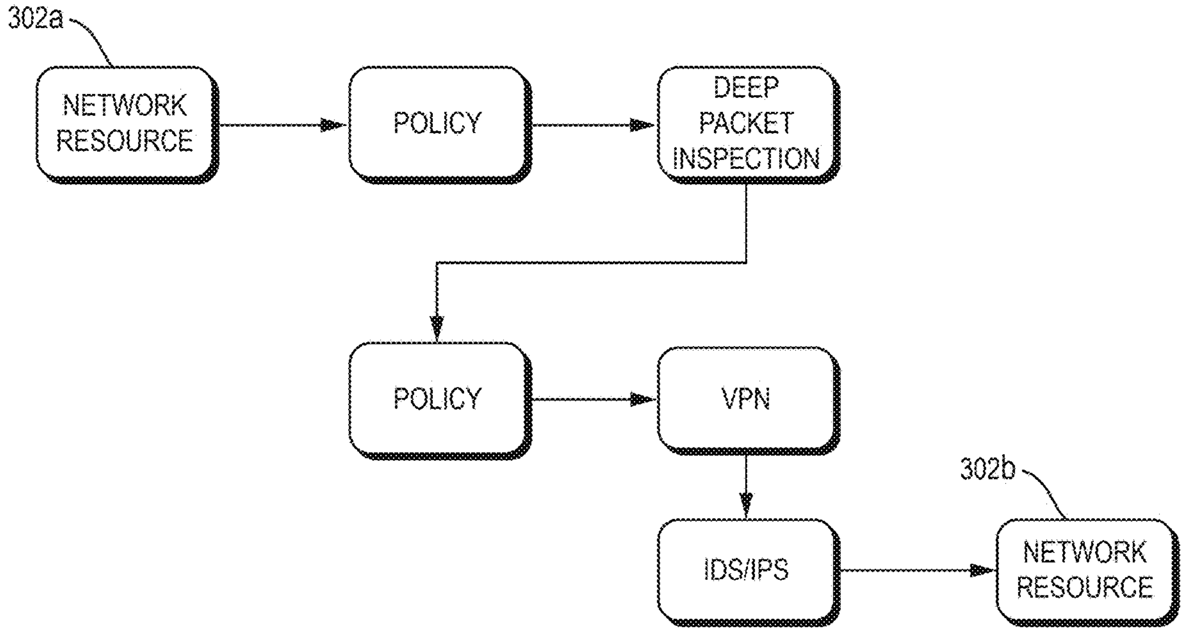
FIG. 4 shows an example embodiment of movement of traffic from one service function chain to another service function chain.

FIG. 4 shows an example embodiment of movement of traffic from one service function chain to another service function chain.

To summarize, the example embodiments described herein (i) extends Kubernetes API to support Policies, (ii) delivers on a programmable and dynamic Service Function Chain, (iii) applies policies at Flow level to redirect into the Service functions, (iv) uses Kubernetes (or other container management tool) to program a forwarding plane in Open vSwitch, (v) facilitates dynamic service insertion as Containers and programs the forwarding plane automatically using native Kubernetes function (instead of a complex VM management), (vi) supports the ability to chain a set of Service Function Chains, (vi) supports the ability to mix and match different encapsulations for each Service in a Service function chain.

A summary of packet migration through a network resource may be summarized as follows:

A. When a packet arrives on a network resource such as a port, the packet's headers are matched against the policy match selectors.

B. When a match is found, the system identifies the first service to send the packet for further processing.

C. Before forwarding to that service, the system adds one of the encapsulation headers (NSH, VLAN or DiffServ) to the incoming packet. This encapsulation payload contains data that will be used by the next in line service to process the packet. The data is also used to make the next service action decision in the service chain.

D. When the service receives the packet, it can apply its own service rules (which are different from the Certes Policy) and its action associated with it.

E. If the packet requires further processing, the service will forward the packet back to the data plane system to process it further. The system uses the encapsulation context to identify the service chain being used and identifies the next service in the list and forwards the packet to that service along with that encapsulation.

F. When the final service completes its work on the packet and forwards it back, the system then makes the final action decision as to whether the flow is terminated or forwarded on to another network resource (port).

G. It should be noted that the decision to send the packet to a network resource can also happen in the middle of the policy, which allows the policy to be defined across the network encompassing multiple devices if required.

While example embodiments have been particularly shown and described, it will be understood by those skilled in the art that various changes in form and details may be made therein without departing from the scope of the embodiments encompassed by the appended claims.

What is claimed is:

1. A method of managing and deploying network resources, comprising:

employing a container management tool in a network that implements resources through one or more containers; and supplementing the container management tool with a policy extension framework that, natively within the container management tool, facilitates:

(i) a user dynamically generating a policy that enforces an intent of the user and (ii) implementing the policy in a forwarding plane of the network so that the policy controls one or more network flows, the policy defining one or more associations between a flow characteristic and a network resource such that the network resource operates on a network flow that has the flow characteristic.

2. The method of claim 1, further comprising using a declarative programming language to convey the intent of the user to the policy extension framework.

3. The method of claim 1, wherein the container management tool is Kubernetes.

4. The method of claim 3, wherein the policy extension framework defines policy as a Custom Resource Definition (CRD).

5. The method of claim 1, wherein the container comprises a microservice that is packaged along with associated dependencies and configurations.

6. The method of claim 1, further comprising:

defining, by the user, at least one network resource;

defining, by the user, at least one service;

defining, by the user, at least one policy;

delivering network data traffic to the at least one service according to the at least one policy.

7. The method of claim 6, wherein the at least one network resource is defined on Open vSwitch.

8. The method of claim 6, further comprising programming match selectors as match rules in the forwarding plane of the network, the match selectors being programmed according to the intent of the user.

9. The method of claim 8, further comprising forwarding a data packet at an applied network port through a service function chain when the data packet matches the match selectors.

10. The method of claim 6, wherein the at least one policy causes the forwarding plane to configure an action list as a sequential service function chain in a data path.

11. A system for managing and deploying network resources in a network that implements resources through one or more containers, comprising:

a processor; and a memory with computer code instructions stored thereon, the memory operatively coupled to the processor such that, when executed by the processor, the computer code instructions cause the system to:

supplement a container management tool with a policy extension framework that, natively within the container management tool, facilitates:

(i) a user dynamically generating a policy that enforces an intent of the user and (ii) implementing the policy in a forwarding plane of the network so that the policy controls one or more network flows;

the policy defining one or more associations between a flow characteristic and a network resource such that the network resource operates on a network flow that has the flow characteristic; and use a declarative programming language to convey the intent of the user to the policy extension framework.

12. The system of claim 11, wherein the container management tool is Kubernetes.

13. The system of claim 12, wherein the policy extension framework defines policy as a Custom Resource Definition (CRD).

14. The system of claim 11, wherein the container comprises a microservice that is packaged along with associated dependencies and configurations.

15. The system of claim 11, wherein the computer code instructions, when executed by the processor, further cause the system to:

define at least one network resource based on input from the user;

define, by the user, at least one service;

define, by the user, at least one policy; and deliver network data traffic to the at least one service according to the at least one policy.

16. The system of claim 15, wherein the at least one network resource is defined on Open vSwitch.

17. The system of claim 15, further comprising match selectors programmed as match rules in the forwarding plane of the network, the match selectors being programmed according to the intent of the user.

18. The system of claim 17, further comprising a data packet forwarded at an applied network port through a service function chain when the data packet matches the match selectors.

19. The system of claim 15, wherein the at least one policy causes the forwarding plane to configure an action list as a sequential service function chain in a data path.

20. A non-transitory computer-readable medium with computer code instruction stored thereon, the computer code instructions, when executed by a processor, cause a system to:

supplement a container management tool with a policy extension framework that. natively within the container management tool, facilitates:

(i) a user dynamically generating a policy that enforces an intent of the user and (ii) implementing the policy in a forwarding plane of the network so that the policy controls one or more network flows;

the policy defining one or more associations between a flow characteristic and a network resource such that the network resource operates on a network flow that has the flow characteristic; and using a declarative programming language to convey the intent of the user to the policy extension framework.

* * * * *